US005259875A

United States Patent [19]

Tanaka et al.

[11] Patent Number: 5,259,875

[45] Date of Patent: Nov. 9, 1993

[54] INK RIBBON FOR PRINTER AND INK THEREFOR

[75] Inventors: Masayuki Tanaka; Hiromichi Suzawa; Masayuki Kubota; Chiaki Sekioka; Minako Sato; Hisashi Uemura, all of Fukushima, Japan

[73] Assignee: Fujitsu Isotec Limited, Tokyo, Japan

[21] Appl. No.: 894,496

[22] Filed: Jun. 5, 1992

Related U.S. Application Data

[62] Division of Ser. No. 489,114, Mar. 5, 1990, Pat. No. 5,135,803.

[30] Foreign Application Priority Data

| | | | |
|---|---|---|---|
| Mar. 6, 1989 | [JP] | Japan | 1-052133 |
| Mar. 13, 1989 | [JP] | Japan | 1-058004 |
| Mar. 17, 1989 | [JP] | Japan | 1-063882 |

[51] Int. Cl.$^5$ ..... C09D 11/02

[52] U.S. Cl. ..... 106/23 R; 106/23 E; 106/27 R; 106/32

[58] Field of Search ..... 106/23, 27, 32, 23 R, 106/23 E, 27 R, 32

[56] References Cited

U.S. PATENT DOCUMENTS

| | | | |
|---|---|---|---|
| 3,031,317 | 4/1962 | Spevacek | 106/23 |
| 3,053,177 | 9/1962 | McHugh et al. | 106/23 |
| 3,436,234 | 4/1969 | Terry et al. | 106/23 |
| 3,666.501 | 5/1972 | Barnett et al. | 106/23 |
| 4,193,906 | 3/1980 | Hatanaka | 106/23 |
| 4,310,356 | 1/1982 | Trubiano et al. | 106/23 |
| 4,427,739 | 1/1984 | Kohle et al. | 106/23 |
| 4,462,832 | 7/1984 | Jettmar et al. | 106/23 |
| 4,565,576 | 1/1986 | Salgó et al. | 106/23 |
| 4,652,486 | 3/1987 | Tasaka et al. | 106/27 |
| 4,657,591 | 4/1987 | Shioi et al. | 106/23 |
| 4,758,276 | 7/1988 | Lin et al. | 106/27 |
| 4,836,852 | 6/1989 | Knirsch et al. | 106/23 |
| 5,017,228 | 5/1991 | Goda | 106/23 |

FOREIGN PATENT DOCUMENTS

| | | |
|---|---|---|
| 0168045 | 1/1986 | European Pat. Off. . |
| 986139 | 3/1965 | United Kingdom . |
| 1050711 | 12/1966 | United Kingdom . |

OTHER PUBLICATIONS

Japanese patent abstracts, vol. 6, No. 216. p. 7 M-168, Pat. Off. Jap. Govt., Oct. 29, 1982 of JP 57-120483, Jul. 27, 1982.

Japanese patent abstracts, vol. 11, No. 94, p. 162 M-574, Pat. Off. Jap. Govt., Mar. 25, 1987 of JP 61-246083, Nov. 1, 1986.

English language abstract of JP 61-246083, Nov. 1, 1986.

English language abstract of JP 62-28283, Feb. 6, 1987.

*Primary Examiner*—Helene Klemanski

*Attorney, Agent, or Firm*—Armstrong, Westernman, Hattori, McLeland & Naughton

[57] ABSTRACT

An ink ribbon for a printer, particularly an impact type printer such as a wire dot printer or daisy wheel printer, as well as a black ink to be used for an ink ribbon for a printer.

7 Claims, 3 Drawing Sheets

INK RIBBON FOR PRINTER AND INK THEREFOR

This is a division of application Ser. No. 489,114 filed Mar. 5, 1990, now U.S. Pat. No. 5,135,803.

BACKGROUND OF THE INVENTION

1. Field of the Invention

The present invention relates to an ink ribbon for a printer, more particularly to an ink ribbon for an impact type printer for a computer, such as a wire dot printer or daisy wheel printer. The present invention also relates to an ink to be used for an ink ribbon for a printer, particularly a black ink to be used for an ink ribbon for a printer such as wire dot printer.

2. Description of the Related Art

Impact type printers such as wire dot printers or daisy wheel printers are now widely used, due to the increase in the use of computers and office automation. The cloth ink ribbons to be used in such printers usually comprise cotton cloth, silk cloth or nylon cloth as the base cloth, and contain an ink prepared by dissolving or dispersing dyes or colorants such as dyes in various solvents and coated on or impregnated in such a base cloth.

Cotton cloth, however, although having a good ink retentivity, has a problem of a lack of printing sharpness due to a thick cloth thickness. A silk cloth, although having a good ink retentivity and printing sharpness, has the problems of a poor durability and a high cost. On the other hand, the nylon fiber cloth now in use, although having an excellent durability, has a thickness as thick as 120 to 140 μm. Accordingly, the problem that a sharply printed character cannot be transferred arises, and thus a sharp print is difficult to obtain even when the wire of the printing head is made finer.

Furthermore, in the prior art, soft dyes having absorption bands at visible regions of about 400 to less than 700 nm have been exclusively used, but these colorants have no absorption band at the near infrared region (700 nm to 900 nm), which is the wavelength of most bar codes now in use, and therefore, can not be used for that purpose.

Therefore, a hard pigment has been used in the prior art as the colorant having an absorption band in the infrared region (700 nm or higher) such as carbon black, black titanium oxide, or metal oxide, and accordingly, the wire of the printer was susceptible to abrasion by the hard pigment on which the wire is impacted through the ink ribbon. Also, this abrasion of the wire is caused by an adhering of the ink to the wire and a penetration of the hard pigment into the gap between the wire and the wire guide.

As described above, the ink ribbon for the impact type printer, such as a wire dot printer or daisy wheel printer, of the prior art has the problem of poor durability or printing sharpness and cannot cope with a high-speed operation of a printing head.

Various printers are widely used as the printing recording means of terminals of computers, etc., and various inks are used for the ribbons of printers such as a wire dot printer. The ink is impregnated in such printing ribbons, and particularly for black printing ribbons, a carbon black alone or together with, for example, a black oil-soluble dye such as nigrosine or aniline black, is used.

The black ink ribbon of the prior art as mentioned above contains carbon black as the colorant, and thus has problems such as an abrasion of the wire of the printer head or a generation of print blurring due to the presence of the black oil-soluble dye generally used therewith in combination. To maintain the blackness, sharpness and light resistance of a printed character, however, it is impossible to exclude a considerable amount of carbon black from the ink formulation for printer, and it has been necessary to formulate a black oil-soluble dye in a considerable amount to prolong the life of the ink ribbon by lowering the amount of carbon black formulated, to inhibit the abrasion of the wire while maintaining the print characteristics at as high a level as possible.

SUMMARY OF THE INVENTION

Accordingly, the objects of the present invention are to eliminate the above-mentioned disadvantages of the prior art and to provide an ink ribbon for a printer having an excellent durability and printing sharpness which is able to cope with the high-speed operation of a printing head, to thereby solve the problems of the prior art.

Another object of the present invention is to solve the problem of the prior art, i.e., that the ink of the prior art formulated with a soft colorant has no absorption band in the near infrared region and must use a hard colorant having absorption band in the wavelength region of 700 to 900 nm, whereby abrasion of the wire of the printer occurs, and provide an ink ribbon for a printer having an absorption band in the near infrared region, formed with a soft colorant coated thereon or impregnated therein.

A further object of the present invention is to provide an ink for an ink ribbon which will eliminate the problems of the prior art, namely abrasion of the wire of the printing head or print blurring, without impairing the blackness and light resistance of the printed characters.

Other objects and advantages of the present invention will be apparent from the following description.

In accordance with the present invention, there is provided an ink ribbon for a printer, comprising a 6,6 nylon cloth having 15 to 25 filaments with a mono-filament fineness of 10 to 25 deniers as warps and 15 to 30 filaments of 15 to 30 deniers as wefts, a warp density of 220 to 300 (monofilament number/inch) and a weft density of 120 to 180 (monofilament number/inch), with a thickness of 70 to 110 μm, as the base cloth.

In accordance with the present invention, there is also provided an ink ribbon for a printer, comprising an oil-soluble ink containing 0.1 to 10% by weight of an IR-absorptive organic dye coated on or impregnated in a base cloth.

In accordance with the present invention, there is further provided a black ink for a printer printing ribbon, comprising a black oil-soluble dye and at least two kinds of soft organic pigments which give a black color by a formulation of same in combination.

BRIEF DESCRIPTION OF THE DRAWINGS

The present invention will be better understood from the description set forth below with reference to the accompanying drawings, wherein.

DESCRIPTION OF THE PREFERRED EMBODIMENTS

Figure 1A:
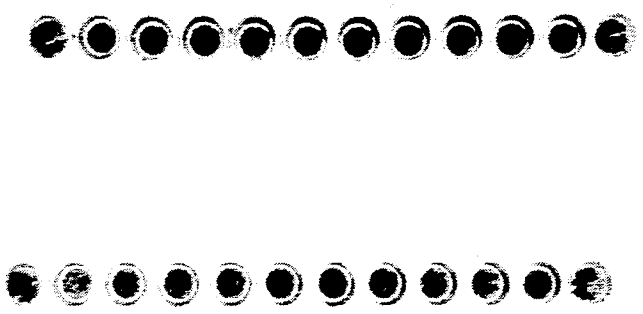
FIGS. 1 (*a*), (*b*), and (*c*) are photographs illustrating the abraded conditions of the pins after a 200,000,000 times printing test of Example 3.

According to the first aspect of the present invention, the above-mentioned problem is solved by the use of a 6,6-nylon cloth having 15 to 25 filaments with a monofilament fineness of 10 to 25 deniers as warps and 15 to 30 filaments of 15 to 30 deniers as wefts, a warp density of 220 to 300 (monofilament number/inch) and a weft density of 120 to 180 (monofilament number/inch), with a thickness of 70 to 110 μm, as the base cloth.

As described above, in the present invention, as the base cloth of the ink ribbon for a printer, a fiber cloth of 6,6-nylon fibers is used, and as the warp of the fabric (length direction of the ribbon) 15 to 25, preferably 15 to 20, filaments with a monofilament fineness of 10 to 25 deniers, preferably 15 to 25 deniers, are used, and as the weft (width direction of the ribbon), 15 to 30, preferably 15 to 25, filaments with a monofilament fineness of 15 to 30 deniers, preferably 20 to 30 deniers, are used. By thus constituting the base cloth of the ink ribbon for a printer, the cloth thickness can be made 70 to 110 μm, preferably 80 to 100 μm (in the prior art 120 to 140 μm), and the printing width can be reduced by 5 to 10% to enable a sharp printing, whereby the wire of the printing head and the copying capacity (number of papers capable of being sharply printed at one printing) also can be increased by 20%, and yet an ink ribbon for a printer having an excellent durability can be obtained.

The 6,6-nylon cloth preferably has a warp density of 225 to 250 (monofilament number/inch) and a weft density of 125 to 150 (monofilament number/inch).

As described above, according to the present invention, by reducing the thickness of the ink ribbon for a printer, the printing gap can be reduced and a high-speed printing head operation can be effected. Also, according to the present invention, the printing quality and sharpness are excellent, and the copying capacity is improved.

According to the second aspect of the present invention, the problem of the prior art is solved by an IR-absorptive ink ribbon for a printer, comprising an oil-soluble ink containing 0.1 to 10% by weight of an IR-absorptive organic dye coated on or impregnated in a base cloth.

As the soft IR-absorptive organic dye having an absorption band in the near infrared region, typically the aminium compounds of the following formula (I) or (II) can be included.

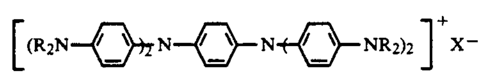
(I)

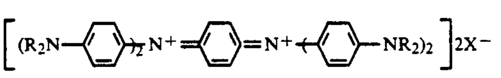
(II)

wherein R represents hydrogen or an alkyl group having 1 to 12 carbon atoms, particularly $CH_3$ or n-$C_4H_9$, and X is $SbF_6$ or $ClO_4$).

When such an aminium compound is used, the absorption in the infrared region can be obtained without the use of carbon black, and this compound has a particular effect of not corroding and abrading metals, and thus is useful for reducing the abrasion of the wire of the printer.

According to the present invention, by formulating an oil-soluble ink according to conventional formulation (e.g., 10% to 20% by weight of oil-soluble dye, 10% to 40% by weight of mineral oil, 15% to 35% by weight of higher fatty acid, 5% to 25% by weight of surfactant, etc.) and coating or impregnating this ink onto a 6-nylon cloth, a 6,6-nylon cloth, a silk cloth, or a polyester cloth, has an absorption band in the near infrared region, and therefore, can be effectively used as the ink ribbon for a bar code printing, and since the above-mentioned organic dye is soft, an ink ribbon for printer which causes substantially no abrasion of the wire of printer can be provided.

A typical example of the oil-soluble dyes is nigrosine-base. Typical examples of the mineral oils are liquid paraffin and various lubricating oils. Typical examples of the higher fatty acids are oleic acid, stearic acid, lauric acid. Typical examples of the surfactants are sorbitan monoleate, sorbitan trioleate, polyoxyethylene sorbitan monooleate, and polyoxyethylene monolaurate.

As described above, according to the present invention, since an organic dye having an absorption band in the near infrared region is formulated in the IR-absorptive ink ribbon, and since the organic dye is soft, different from the ink ribbon of the prior art containing carbon black, etc., abrasion of the wire of the printer can be greatly reduced and the sensitivity to bar codes can be markedly increased, whereby it becomes possible to read same (IR-region) by a machine even when difficult to read with the naked eye (visible light region), and it can be suitably used as the ink ribbon for a card information recording to be used for an optical reading device (OCR).

According to the third aspect of the present invention, the problem of the prior art is solved by providing a black ink comprising a black oil-soluble dye and at least two kinds of soft organic pigments which give a black color when formulated in combination.

The organic pigment to be used in the present invention is a soft organic pigment which is softer than the printer wire (made of a high speed steel or tungsten), preferably having a mean particle size of 0.5 to 0.01 μm, more preferably 0.1 to 0.05 μm, and at least two kinds thereof are formulated. Typical specific examples of such pigments are shown below. A preferable composition of the organic pigments includes combinations of the three colors, yellow, cyan and magenta, but the organic pigments of the present invention are not limited to these combinations.

Yellow organic pigment: Hanza Yellow, Benzidine Yellow, Vulcan Fast Yellow, Chromophthal Yellow, Lumogen Yellow, Isoindoline Yellow.

Orange organic pigment: Benzidine Orange, Vulcan Orange, Permanent Orange, Naphthol Orange.

Red organic pigment: Parared, Toluidine Red, Permanent Bold, Brilfast Scarlet, Lake red, Permanent Carmine, Perylene Red.

Violet organic pigment: Quinacridone Violet, Dioxazine Violet, Naphthol Violet.

Blue organic pigment: Victoria Blue, Phthalocyanine Blue, Fast Sky Blue, Cyanicidine Blue.

Green organic pigment: Phthalocyanine Green, Violanthrone Green, Permanent Brown, Perylene Bordeau.

In the black ink of the present invention, as the oil-soluble black dye to be used in combination with the organic pigment as mentioned above, any oil-soluble dye which has been formulated as the ink for a ribbon in the prior art can be formulated.

In the black ribbon for a printer of the present invention, other than the organic pigment and the oil soluble dye as mentioned above, any component utilized for this purpose in the prior art can be used. Examples of such components include the above-mentioned mineral oils, higher fatty acids, and surfactants.

The composition of the black ink for a printer of the present invention is not particularly limited, but can be formulated preferably at 5 to 25% by weight of an oil-soluble black dye, 5 to 20% by weight of the organic pigments and other optional components such as 10 to 40% by weight of mineral oils, 15 to 35% by weight of higher fatty acids and 5 to 25% by weight of surfactants.

According to the present invention, since the soft organic pigments as described above are formulated in combination in the ink for a printer ink ribbon together with an oil-soluble dye, a tone very close to a dark black can be obtained without the use of carbon black, and since these organic pigments are soft and have an appropriate degree of oil absorption, the problems of the abrasion of the wire or print blurring are solved.

Namely, as described above, according to the third aspect of the present invention, since two or more kinds of soft organic pigments are formulated in combination, in place of the carbon black of the prior art, in the ink for a printer ribbon, the amount of abrasion of the wire can be greatly reduced, and blurring of the print can be prevented, whereby a sharp printing can be obtained.

EXAMPLES

The present invention will now be further illustrated by, but is by no means limited to, the following Examples.

EXAMPLE 1 AND COMPARATIVE EXAMPLE 1

Using an ink ribbon made of a 6,6-nylon with warps of 20 denier (d)×17 filaments (+) and wefts of 30 d×26 f, having a thickness of 93.5 μm (Example 1), and an ink ribbon made of a 6,6-nylon with warps of 40 d×34 f and wefts of 40 d×34 f, having a thickness of 120 to 130 μm (Comparative Example 1), printing tests were conducted by a 24-pine dot impact printer DPK 24 GH manufactured by Fujitsu Co., Ltd. The wire diameter of the printer was 0.2 mm.

The results are shown in Table 1.

TABLE 1

| | Example 1 | Comparative Example 1 |
|---|---|---|
| Fiber employed | 6,6-Nylon | 6,6-Nylon |
| Warps | 20 d × 17 f | 40 d × 34 f |
| Wefts | 30 d × 26 f | 40 d × 34 f |
| Warp density (monofilaments/inch) | 40 | 213 |
| Weft density (monofilaments/inch) | 129 | 124 |
| Ribbon thickness (μm) | 93.5 | 120–130 |
| Ink impregnation*1 (%) | 25 | 22 |
| Printing sharpness*2 (mm) | 0.28 | 0.3 |
| Copying capacity*3 (sheets) | 6 | 5 |

*1: (impregnated ink weight/base cloth weight before impregnation) × 100, ink coated by ink coating machine, and weights measured before and after coating;
*2: diameter of dot formed on printed paper;
*3: evaluated by number of sheets copied on which a clear printing can be effected.

EXAMPLE 2 AND COMPARATIVE EXAMPLE 2

An ink for a printer ribbon was obtained by stirring and mixing 5 parts by weight of bis(p-dimethyl-amino-phenyl)[N,N-bis(p-dimethylaminophenyl-p-amino-phenyl)aminium-hexafluoroantimonic acid ester (prepared by the method described in U.S. Pat. No. 4,699,863), 20 parts by weight of a black oil-soluble dye (nigrosine base), 40 parts by weight of a mineral oil, and 30 parts by weight of a surfactant (sorbitane sesquinoleate).

This ink was ten coated on a fabric made of 6,6-nylon, in a coated amount of 15 g/m$^2$, and using this ink ribbon, printing was effected 2 hundred million times by a dot printer DPK24GH manufactured by Fujitsu K.K., and it was found that the amount of wire abrasion 5 μm or less.

Next, as a Comparative Example 2, an ink ribbon was manufactured by using 5 parts by weight of carbon black in place of the organic dye in the above Example. When the printing test was conducted while using this ink 2 hundred million times in the same manner as in the above Example, the amount of wire abrasion of the printer was about 40 μm.

EXAMPLES 3 AND 4 AND COMPARATIVE EXAMPLE 3

Figure 1B:
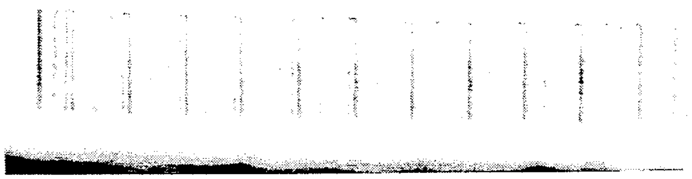
Figure 1C:
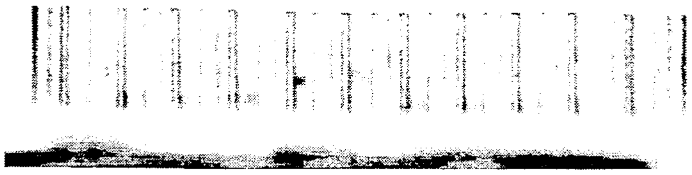
Figure 2A:
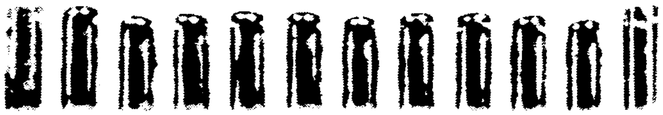
FIGS. 2 (*a*) and (*b*) are photographs illustrating the abraded conditions of the pins after a 200,000,000 times printing test of Comparative Example 3.
Figure 2B:
Figure 3:
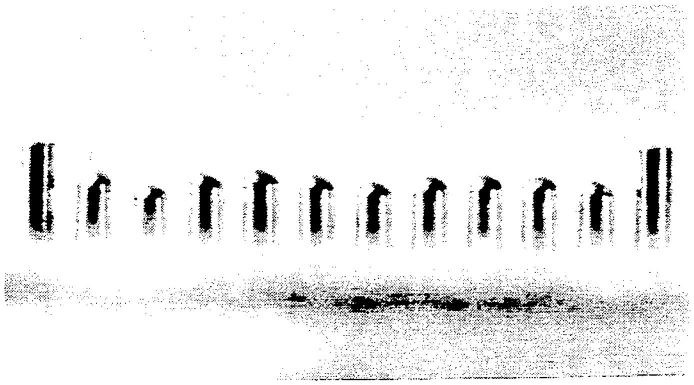
FIGS. 3 (*a*) and (*b*) are photographs illustrating the abraded conditions of the pins after a 200,000,000 times printing test when carbon black is formulated.
Figure 3:

Two kinds of black ink with the formulations shown in Table 2 were formulated and were impregnated in a 6,6-nylon base cloth. When the pins with the highest frequency of use reached one hundred million and two hundred million printings of a standard pattern, using a 24 pin dot impact printer DPK-24EH manufactured by Fujitsu Co., Ltd., the amount of abrasion of all of the pins (particularly other than abrasion of the wire tip ends, the armature of the bin base is also abraded, whereby the height of pin is lowered) were measured. The results are also shown in Table 3, and FIGS. 1, 2, and 3.

TABLE 2

| | (parts by weight) | | |
|---|---|---|---|
| Composition | Example 3 | Example 4 | Comparative*2 Example 3 |
| Pigment (carbon) | 0 | 0 | 5 |
| Pigment (Organic pigment*1) | 5 | 10 | — |
| Pigment (Aniline black) | 5 | 0 | 5 |
| Dye (nigrosine) | 20 | 15 | 20 |
| Mineral oil (fluid paraffin) | 30 | 30 | 30 |
| Fatty acid (oleic acid) | 20 | 25 | 20 |
| Surfactant (nonionic) | 20 | 20 | 20 |

*1: Seika Fast Yellow 2015 (Hanza Brilliant Yellow) (4 parts)/Seika Carmine 6B/478 (Carmine 6B) (3 parts) Chromofine Blue 4927 (Phthalocyanine Blue) (5 parts) (all produced by Dainichi Seika K.K.)
*2: Low abrasion ink of the prior art
(Note) The ink of the Examples gave a sharp printing equal to the ink of the Comparative Example, and no blurring of the print was observed.

TABLE 3

| Ink | One hundred million printing | | Two hundred million printing | |
|---|---|---|---|---|
| | Abraded amount range (μm) | Average value (μm) | Abraded amount range (μm) | Average value (μm) |
| Example 3 | 0-11.5 | 5.4*1 | 0-13 | 5.1*1 |
| Example 4 | 0-9.5 | 5.1*1 | 0-12 | 5.3*1 |
| Comparative Example 3 | 1-26 | 14.1 | 10-48 | 28.05 |

*1: Practically due to abrasion (collapse) of armature, the tip end of the wire pin was not substantially abraded.

(Note) The amount abraded in the case of the ink formulated with carbon black only is about 80 μm (one hundred million printing), and about 160 μm (two hundred million printing).

We claim:

1. A black ink for use with a printing ribbon of a printer, comprising an oil-soluble black dye and at least two nonabrasive organic pigments selected from the group consisting of yellow organic pigments, orange organic pigments, red organic pigments, violet organic pigments, blue organic pigments, and green organic pigments, whereby a black colored ink results.

2. A black ink as claimed in claim 1, wherein the oil-soluble black dye is nigrosine.

3. A black ink as claimed in claim 1, wherein the nonabrasive organic pigment is softer than a printer wire.

4. A black ink as claimed in claim 1, wherein the nonabrasive organic pigment has a mean particle size of 0.01 to 0.5 μm.

5. A black ink as claimed in claim 1 comprising 5% to 25% by weight of an oil-soluble black dye, 5 to 20% by weight of at least two kinds of the nonabrasive organic pigment, 10% to 40% by weight of a mineral oil, 15% to 35% by weight of a higher fatty acid, and 5% to 25% by weight of a surfactant.

6. A black ink as claimed in claim 1, wherein the nonabrasive pigments are selected from the group consisting of hanza yellow, orange pigment, brilliant carmine, quinacridone violet, and victoria blue.

7. A black ink as claimed in claim 1, wherein the nonabrasive pigments are selected from the group consisting of C.I.No. 11741 (yellow), C.I.No. 12060 (orange), C.I.No. 15850:1 (red), C.I.No. 46500 (violet), and C.I.No. 44045:2 (blue).

* * * * *